United States Patent

[11] 3,590,433

[72] Inventor Vaughn Rawls
 Lima, Ohio
[21] Appl. No. 702,224
[22] Filed Feb. 1, 1968
[45] Patented July 6, 1971
[73] Assignee National-Standard Company
 Niles, Mich.

[54] TIRE MOLDING MACHINE
 10 Claims, 8 Drawing Figs.
[52] U.S. Cl. ................................................ 18/18,
 18/2TT
[51] Int. Cl. ................................................ B29h 5/04
[50] Field of Search ................................... 18/17 W,
 17 K, 18 F

[56] References Cited
 UNITED STATES PATENTS
 2,812,547 11/1957 Duerksen et al. ............ 18/18 F

| 2,826,783 | 3/1958 | Robbins | 18/18 F |
| 2,987,770 | 6/1961 | Powell | 18/18 F |
| 3,015,845 | 1/1962 | Duerksen | 18/18 F |
| 3,074,109 | 1/1963 | Duerksen | 18/18 F |
| 3,130,446 | 4/1964 | Duerksen | 18/2 TT |
| 3,162,898 | 12/1964 | Fike | 18/2 TT X |
| 3,184,794 | 5/1965 | Sherkin | 18/18 F |
| 3,418,400 | 12/1968 | Clapp | 18/18 F X |

Primary Examiner—J. Howard Flint, Jr.
Attorney—Johnson, Dienner, Emrich, Verbeck and Wagner ABSTRACT: Tire molding machine embodying relatively movable tire vulcanizing molds formed with desired tire tread matrices for receiving therebetween a tire carcass having tread material applied thereto, including opposed tire bead guides movable conjointly and uniformly relative to each other to maintain the tire beads and the tire carcass in centered relation with respect to the molds and thus provide an accurately centered tread for the tire.

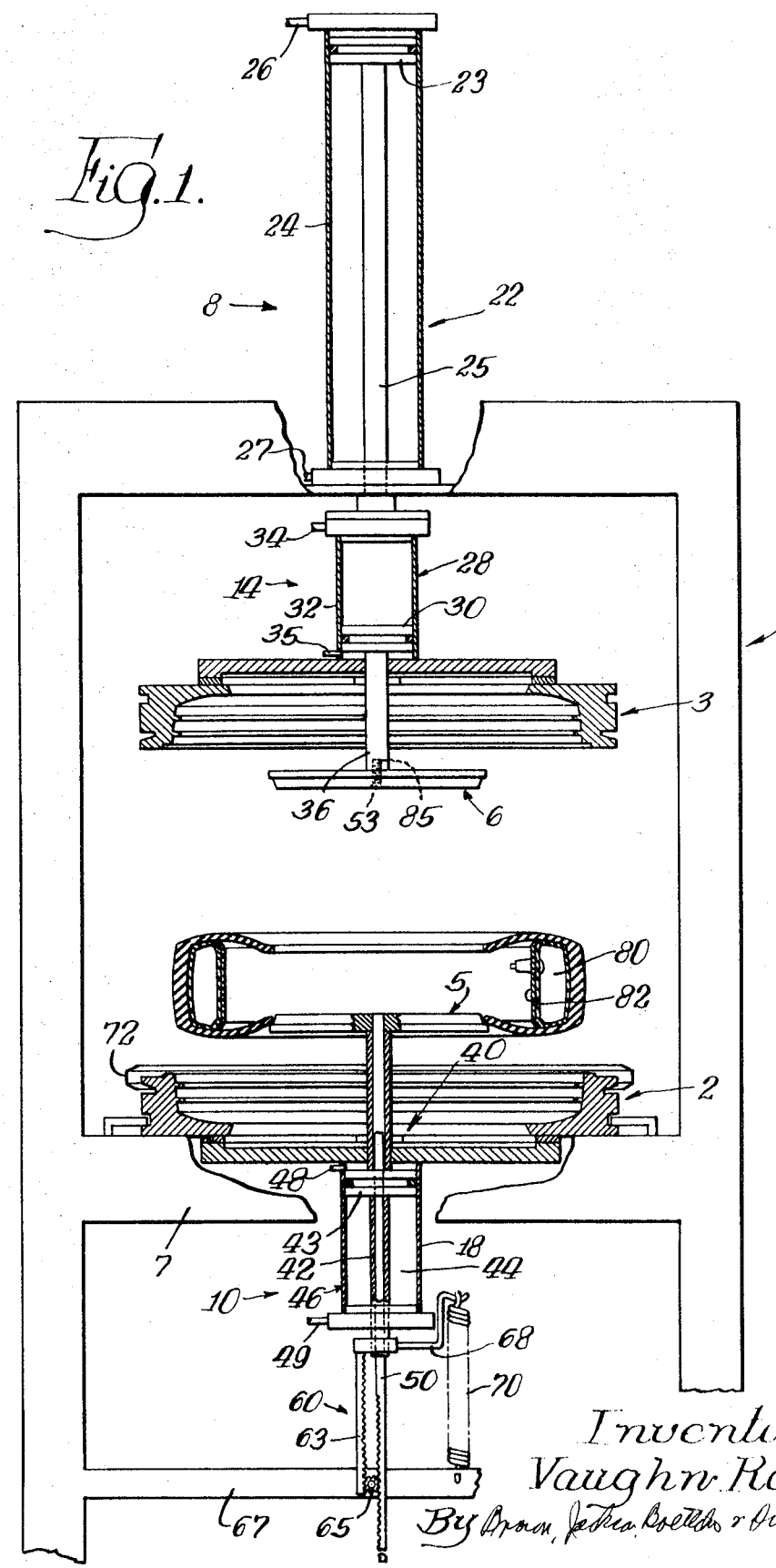

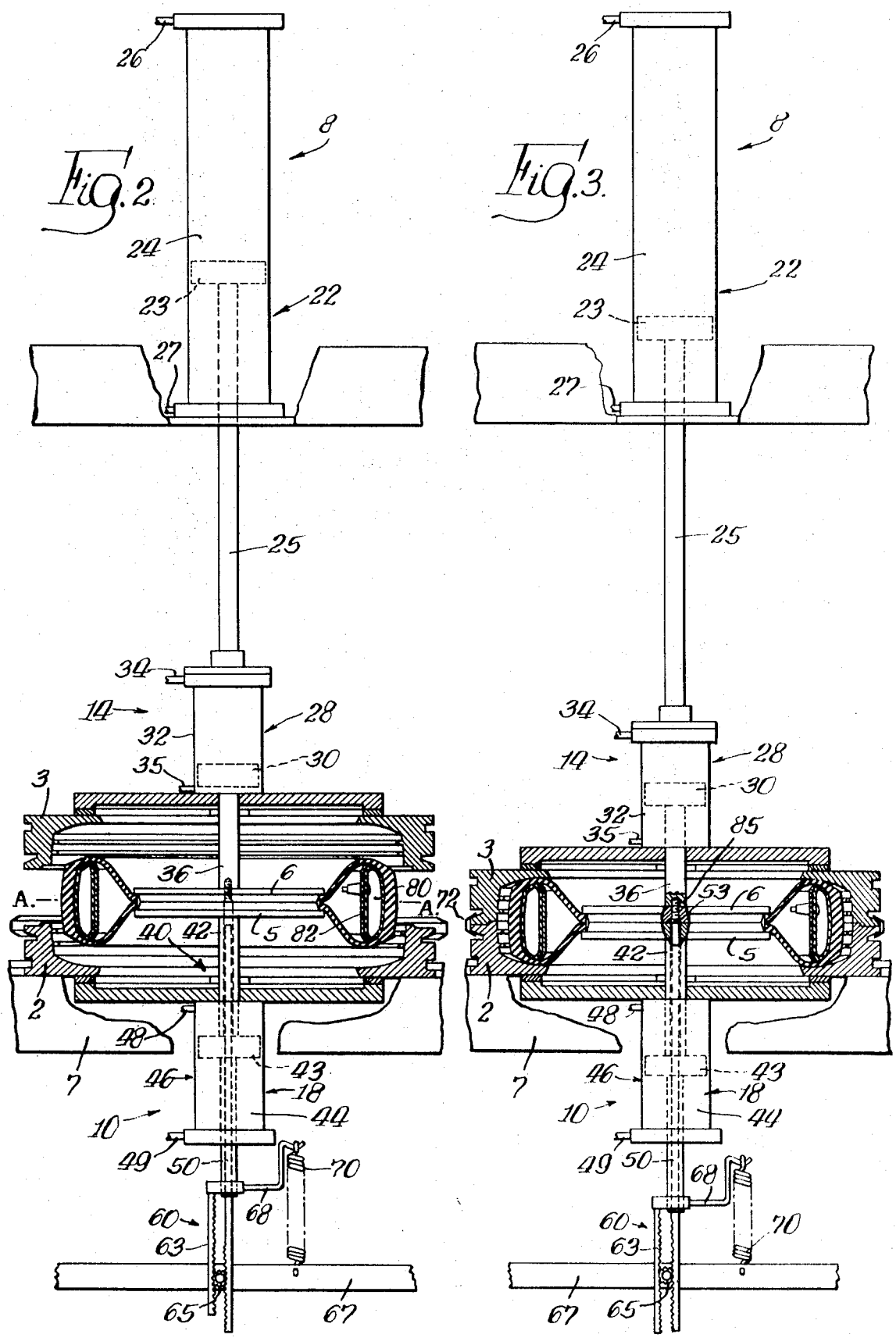

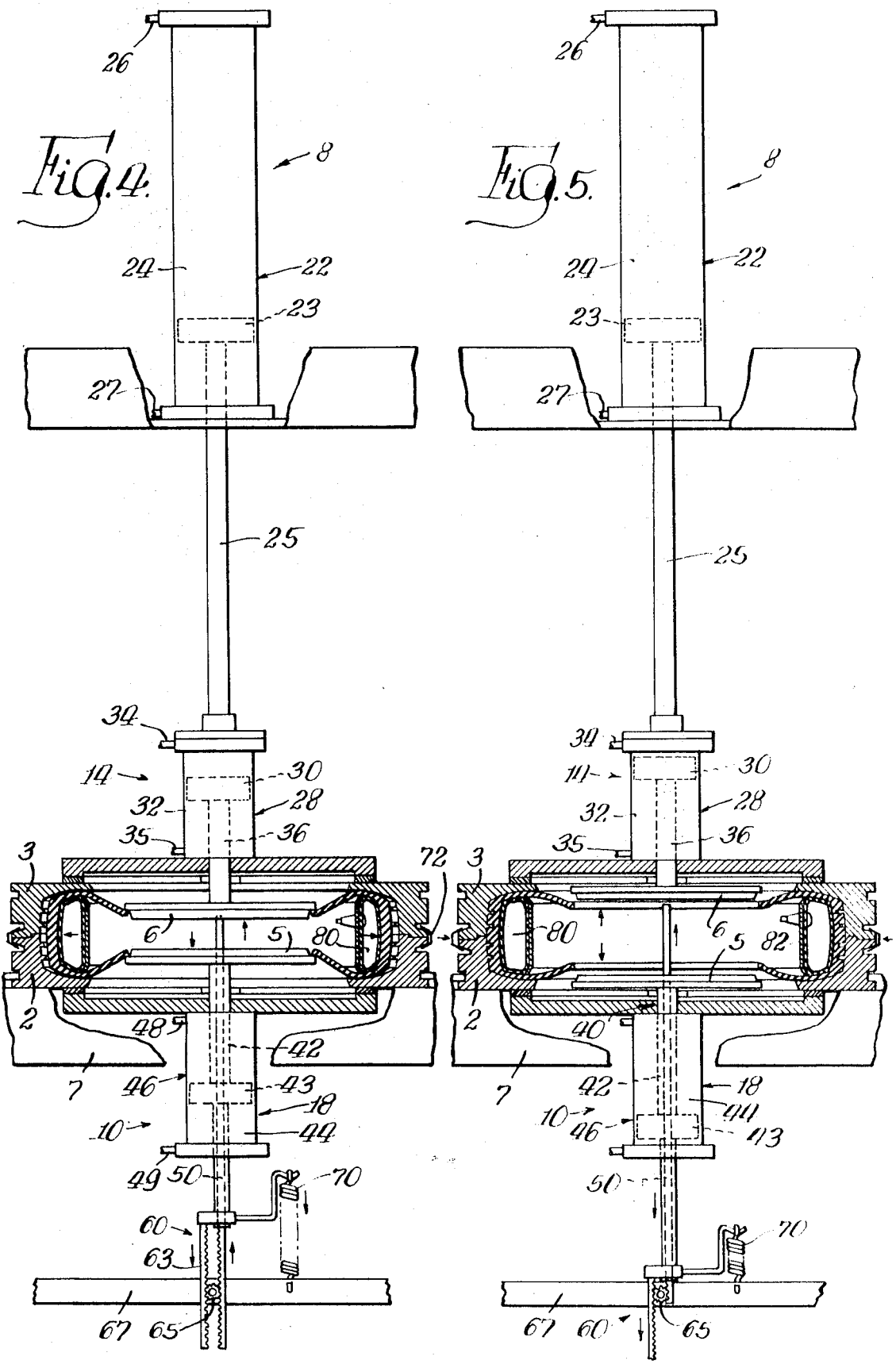

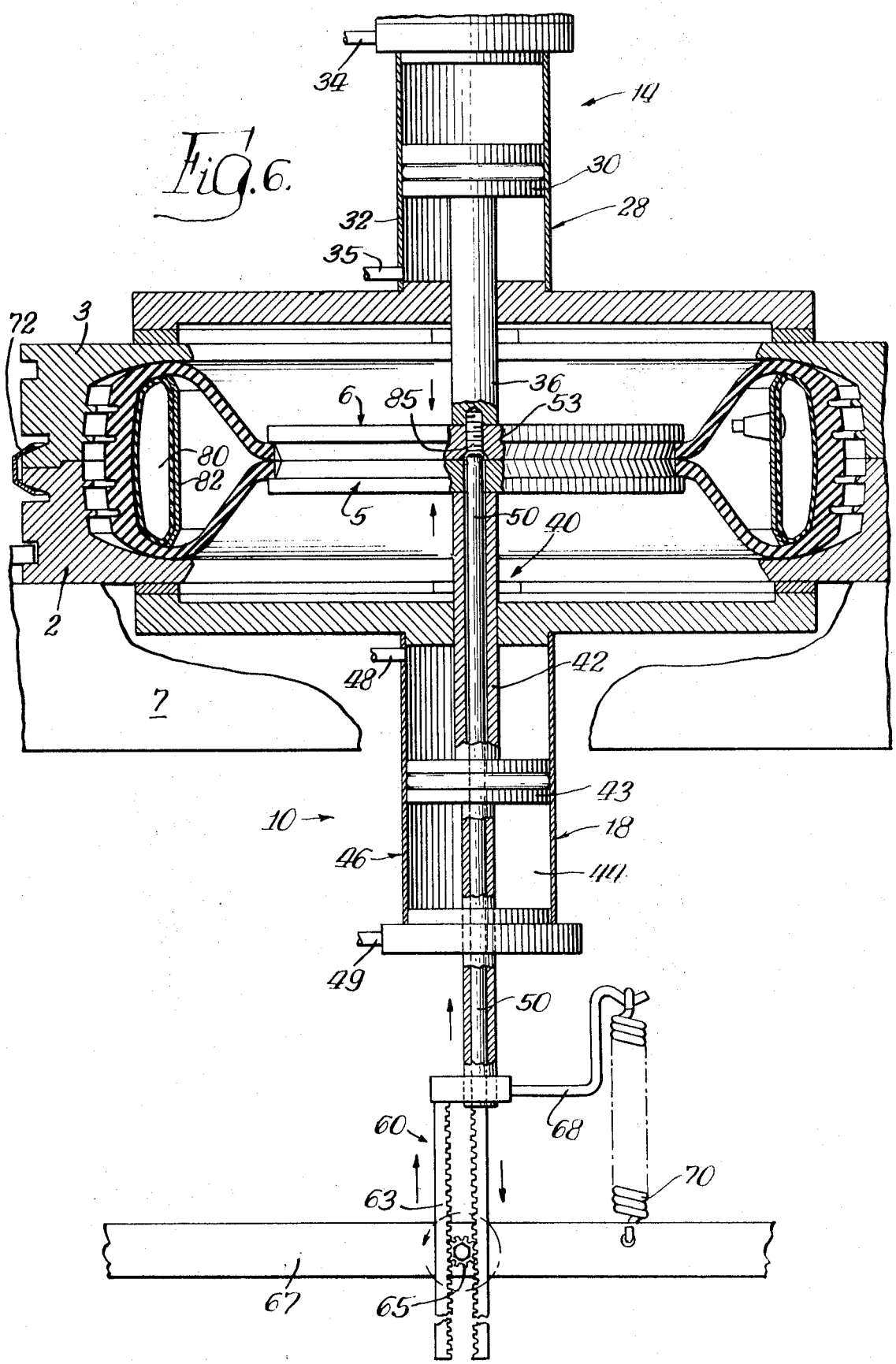

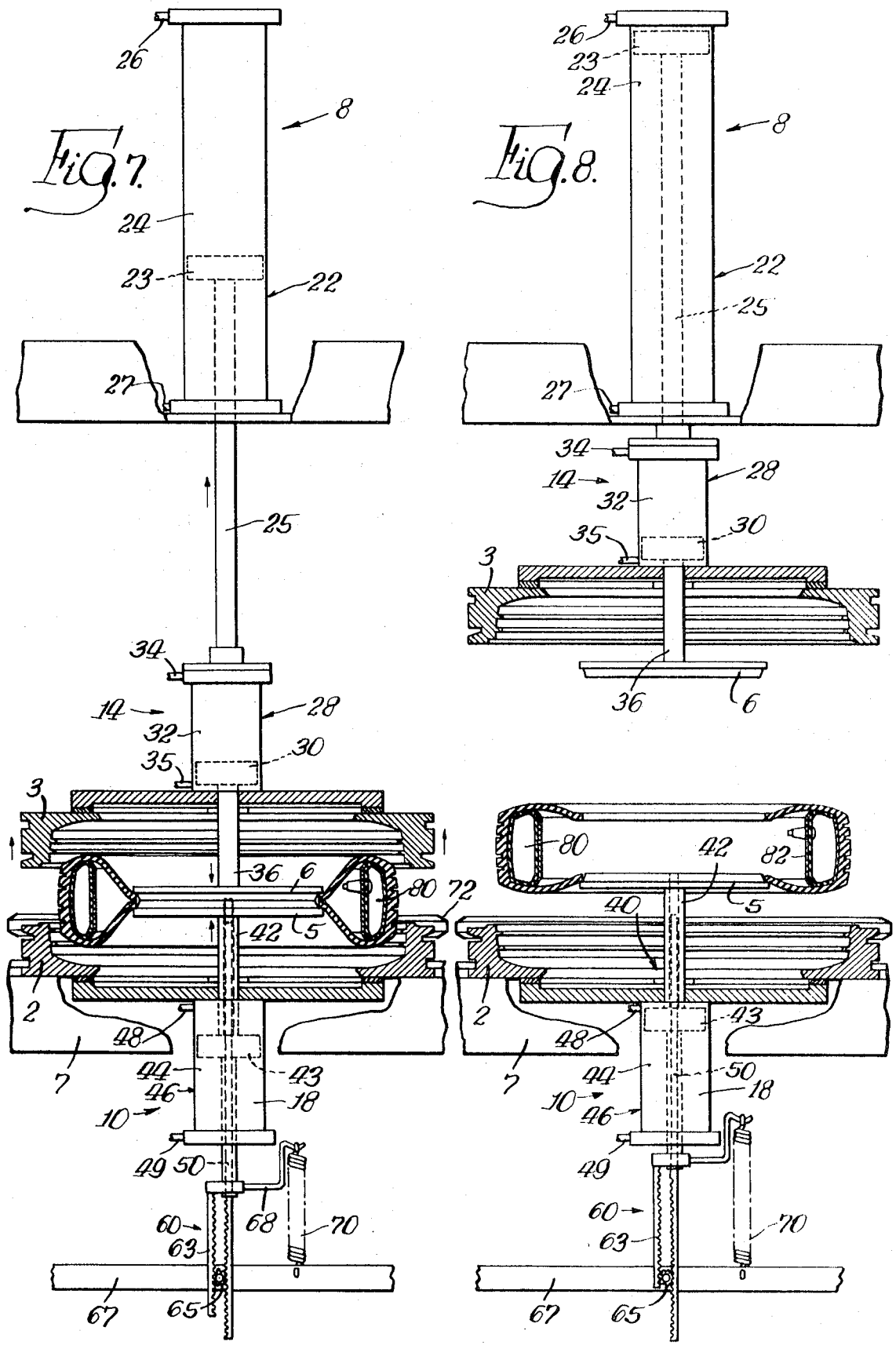

TIRE MOLDING MACHINE

In applying a tire tread to a tire carcass as, for example, in retreading a tire from which a worn tread has been removed as by buffing, it is common practice to apply new tread material to the buffed carcass and then insert the carcass with the newly applied tread material between a pair of matching tire vulcanizing molds formed with desired tread matrices for displacement of the tread material into the matrices of the molds and to vulcanize the applied tire tread material. In prior art devices of the category noted an air bag and curing rim are assembled in known manner within the tire carcass and after placing such assembly between the molds and closing of the molds, air under pressure is admitted into the air bag to displace the tread material into the matrices of the molds.

In the known prior art devices, considerable difficulty is encountered in maintaining the tire tread material in centered relation with respect to the carcass and tire beads with the result that the tire tread is not truly centered on the tire carcass so that the resulting tire is not in good balance.

It is an object of the present invention to provide a tire molding machine embodying movable tire vulcanizing molds having associated therewith tire bead guide means for engaging the tire beads of a tire carcass to maintain the tire beads in symmetrical relationship with respect to the carcass and tread material to provide a well centered tire tread for the tire.

It is a further object of the invention to provide a tire molding machine as last noted embodying motion transmitting means providing for conjoint and uniform movement of the tire bead guides toward and away from each other when engaged with the tire beads of the carcass.

A further object of the invention is to provide a tire molding machine of the character last noted in which the motion transmitting means includes centering means for guiding movement of the tire bead guides toward and away from each other on the rotational axis of the carcass.

In a preferred embodiment of the invention the aforementioned centering means preferably comprises a centering rod mounted for movement relative to one of the tire bead guides, centering socket means having a socket for the other side of the tire beads guides for receiving one end of the centering rod and in which the motion transmitting means comprises drive means connected with one of the tire bead guides for maintaining one end of the centering rod in engagement with the centering socket in movement of the tire bead guides toward and away from each other.

A further preferred feature of the invention resides in providing the aforementioned centering socket means with adjusting means for adjusting the depth of the socket to enable the desired disposition of the tire carcass in the mold when closed.

A further preferred feature resides in associating biasing means with the aforementioned drive means for normally biasing one tire bead guide away from the other of the tire bead guides.

Further objects and features of the invention will appear from the following detailed description of a preferred embodiment of the invention shown in the accompanying drawings in which:

FIG. 1 is a side elevational view of a tire molding machine constructed in accordance with the principles of the present invention with the tire molds in open position and a tire carcass supported on a lower bead guide at the commencement of a tire forming and vulcanizing operation; and FIGS. 2 through 8 are side elevational views of the machine of FIG. 1 showing the sequence and relative positions of the several components of the machine in molding and vulcanizing a tire.

Referring now to FIG. 1, there is shown a tire molding machine constructed in accordance with the present invention which comprises a main supporting frame at 1, a first or lower tire mold 2, and a second or upper tire mold 3. A first or lower tire bead guide, as indicated generally by the reference numeral 5, is associated with the lower tire mold 2, and a second or upper tire bead guide, as at 6, is associated with the upper tire mold 3. The lower tire mold 2 is supported on an intermediate frame member 7 of the main frame 1.

Mold positioning means, shown at 8, is supported at the upper end of the main frame 1 and provides for movement of the upper mold 3 toward and away from the lower mold 2 to thus provide for opening and closing of the mold cavity formed by the upper and lower tire molds 2 and 3.

Motion transmitting means, indicated generally at 10 is positioned in the main beneath the lower mold 2 and provides for movement of the upper and lower tire bead guides 5 and 6 toward and away from each other when the tire bead guides are in engagement with the tire beads of a tire being molded and formed in the molding apparatus.

First or upper tire bead guide positioning means 14 is associated with mold positioning means 8, and provides for movement of the upper tire bead guide 6 relative to the upper mold 3. Second or lower tire bead guide positioning means 18 is associated with motion transmitting means 10 and provides for movement of the lower tire bead guide 5 relative to the lower mold 2.

In the general organization of components as above described it will be noted that the lower tire mold 2 is of cup-shaped configuration with the open end thereof extending horizontally and opening upwardly. The lower mold 2 is retained in stationary position upon an intermediate frame member 7 by a flanged retaining ring 20 holding the lower mold in a fixed position. In the embodiment of the invention shown, the upper mold 3 is also of cup-shaped configuration with its open end extending horizontally and opposing the open end of the lower mold 2 so that when the upper mold 3 is brought to closed position with respect to the lower mold 2, the inner faces of the molds 2 and 3 define a tire receiving chamber with the inner faces of the tire molds at the outer peripheries thereof having tire tread matrices of desired pattern for displacement of tire tread material thereinto in securing and vulcanizing a desired tread to the periphery of a carcass of a tire.

The aforementioned mold positioning means 8 may, for example, be defined by a first double fluid actuated piston and cylinder assembly 22 comprising a first piston 23 mounted for reciprocation in a first cylinder 24. The piston and cylinder assembly 22 includes fluid connections, as at 26 and 27, providing for reciprocation of piston 23, in known manner, in one direction or the other depending upon which of the fluid connections are under pressure or bleed.

The first bead guide positioning means 14 comprises a second double fluid actuated hydraulic piston assembly 28 having a second piston 30 mounted for reciprocatory movement in a second cylinder 32 with the second cylinder 32 being connected at its closed upper end with the lower of piston rod 25 which at its upper end is securely connected to the first piston 23 of the first piston and cylinder assembly 22. The second piston and cylinder assembly 28 is provided with fluid connections 34 and 35 at opposite ends of the second cylinder 32 to provide for movement of the upper bead guide 6, which as shown, is mounted at the outer end of a piston rod 36 having connection at its other end with the second piston 30. The second piston 30 and the upper bead guide 6 may then be reciprocated relative to upper mold 3 depending upon which of the fluid connections are underpressure or bleed.

The aforementioned motion transmitting means 10 further comprises centering means, indicated generally at 40, which as shown comprises a hollow cylindrical tube 42 connected at its upper end to the lower bead guide 5 and intermediate its ends to a third piston 43 of a third double fluid actuated piston and cylinder assembly 44. The third piston and cylinder assembly comprises a third cylinder 46 within which the third piston 43 is mounted for reciprocation by the selective admission and establishing of bleed through fluid connections 48 and 49 at the upper and lower ends of third cylinder 46. Movement of the third piston 43 in the third cylinder 46 by the selective admission and establishment of bleed at opposite sides of the third piston 43 provides for the raising and lowering of the lower bead guide 5 relative to the lower tire mold 2. A centering rod 50 projects through the hollow rod 42 and the upper outer end of rod 50, which as will presently appear, is adapted to have engagement with a centrally located socket means 53 formed in the upper bead guide 6.

The motion transmitting means 10 further comprises drive means 60 disposed below the third piston and cylinder assembly 44 and, as shown, comprises a toothed rack 63 secured at its upper end to the lower end of the hollow tube 42. A pinion 65 is mounted for rotation on a fixed axis on a lower frame member 67 of the frame 1 for meshing engagement with the toothed rack 63 and with the toothed lower end portion of the centering rod 50 for purposes hereinafter described. A tension spring 70 is anchored at one end to the frame member 67 and at its other end is connected to a bracket 68 fixedly mounted to the upper end of the rack 63 which as before noted is secured to the lower end of the hollow rod 42.

It will be noted that the several foregoing components including the first piston and cylinder assembly 22, the second piston and cylinder assembly 14, the third piston and cylinder assembly 44, the lower and upper tire bead guides 5 and 6, respectively, and the lower and upper tire molds 2 and 3, respectively are arranged on a common vertical axis.

In the position of the parts, as shown in FIG. 1, it will be noted that the first piston and cylinder assembly 22 has been energized to position the upper tire mold 3 in open or spaced away relation with respect to the lower tire mold 2, and that the second piston and cylinder assembly 14 is energized to dispose the upper bead guide 6 in a position projecting well outwardly of the open end of the upper tire mold 3. The third piston and cylinder assembly 44 is energized to dispose the hollow rod 42 and the lower bead guide 5 carried thereby well above the open end of the lower mold 2 for receiving thereon a tire carcass to which tread material has been applied and which tread material it is desired to mold to the tire carcass and provide such tread material with the tread pattern of the matrices of the upper and lower molds. As seen in FIG. 1, one of the tire beads of the tire carcass rests upon a suitably formed beveled annular shoulder of the lower tire bead guide 5 supporting the tire carcass in a horizontal plane with its rotational axis on the aforementioned common axis of the several components of the machine. The upper tire bead guide 6 is also provided with an annular beveled shoulder for cooperation with the other or opposite tire bead of the tire as will presently appear. The tire carcass, in accordance with conventional practice, has an air bag 80 and curing rim 82 assembled therein, and in practicing the present invention the air bag 80 with the tire carcass in the supported position of FIG. 1 is charged with air under pressure to impart rigidity to the tire.

Referring now to FIG. 2, it will be seen that the upper tire mold 3 has been advanced toward the lower tire mold 2 to begin the tire molding and vulcanizing operation. In the illustrated position of the parts the mold positioning means 8 has been suitably energized to lower the upper mold 3, and the second or lower tire bead positioning means 44 has been appropriately energized to retract the lower bead guide 5 toward and partially into the lower tire mold 2. The mold positioning means 8 when energized to assume the position shown in FIG. 2 engages the upper tire bead guide 6 with the upwardly disposed tire bead of the tire carcass. The hollow control rod 42 is also moving downwardly and through drive means 60 has raised the centering rod 50 to engage the upper end thereof with the socket 53 formed centrally of the upper tire bead guide 6 whereby motion transmitting means effects movement of the upper and lower tire bead guides 5 and 6 conjointly and in uniform amount with respect to each other to retain the tire beads symmetrical with respect to a horizontal plane transverse and at right angles to the rotational axis of the tire, as indicated by the line A-A, to maintain the tire beads in true centered relation with respect to th e tire carcass. The engaging of the upper and lower tire bead guides with the tire beads distorts the cross section of the tire carcass to reduce the outside diameter of the tire carcass so that the tire tread material clears the tread matrices at the inner faces of the upper and lower tire molds.

The next succeeding positions of the parts is shown in FIG. 3, from which it will be seen that the mold positioning means 8, the upper tire bead guide positioning means 14, and the lower tire bead guide positioning means 44 have been energized to provide for closing of the mold by disposition of the upper mold part upon the lower tire mold and again the upper and lower tire bead guides are retained in centered relation at the mold parting line by action of the centering rod 50 on the socket means in the upper bead guide 6 through actuation of the aforedescribed drive means 60. With the parts in the last noted position, known conventional clamping ring means 72 is applied at the adjoining central portions of the upper and lower tire molds to securely clamp the tire molds together.

As next seen in FIG. 4, the tire bead guides 5 and 6 are retracting uniformly and conjointly with respect to each other permitting the outside diameter of the tire to increase, and in the illustrated position of the parts it will be seen that the tension spring 70 maintains the upper end of the centering rod 50 in contact with the socket means 53 in the upper bead guide 6 to thus assure symmetry of separation of the tire bead guides 5 and 6 and axial separation of the tire beads of the carcass.

When the tire bead guides 5 and 6 reach the positions shown in FIG. 5 and are no longer in contact with the tire beads air under suitable pressure in air bag 80 effects displacement of tire tread material into the tread matrices of the upper and lower molds 2 and 3. Also, the upper and lower molds are heated in a conventional manner to vulcanize or cure the tire tread material applied to the tire carcass. The parts are retained in this position for a suitable length of time to effect satisfactory curing of vulcanizing of the tire tread material. Preferably the aforementioned clamp 72 and the means for effecting admission of air under pressure to the air bag are interlocked to prevent inflation of the air bag when the clamp is unlocked.

After curing of the tire as described in connection with FIG. 5 the air bag 80, as shown in FIG. 6, is exhausted and the upper and lower bead guides 5 and 6 are conjointly and uniformly moved toward each other to positions in which they again engage the tire beads through the mechanisms aforedescribed to reduce the outside diameter of the tire to permit separation of the upper and lower tire molds for withdrawal of the tire.

After removal of clamp ring means 72 the several aforedescribed parts are then moved to the positions shown in FIG. 7 in which the mold positioning means 8 is being energized to effect movement of the upper tire mold 3 away from the lower tire mold 2, and the upper bead guide positioning means 14 and the lower bead guide positioning means 44 are being suitably energized and, under which conditions, the upper bead guide positioning means has been fully extended, and the lower bead guide positioning means is being extended to maintain distortion of the tire so that its outside diameter clears the tread matrices of the upper and lower molds.

Thereafter the mold positioning means 8 and the lower tire bead guide positioning means 44 are energized to restore the several parts of the machine to the positions thereof shown in FIG. 1. The finished tire is thus supported on the lower bead guide 5 well above the open end of the lower tire mold in position from which it may be readily moved by the operator of the machine.

Of particular importance, reference again may be made to FIG. 4 from which it will be observed that the tension spring 70 applies a biasing force to the hollow tube 42 and through the drive means 60 assures maintaining the outer upper end of the centering rod in contact with the socket of the upper tire bead guide to assure symmetry of separation of the tire bead guides. The tension spring 70, as seen in FIG. 4, assures an imbalance between the piston and cylinder assemblies of the upper and lower bead guide positioning means 14 and 44, respectively, so that the piston and cylinder assembly of lower bead guide positioning means 44 responds preferentially to start the releasing of the tire beads in the same direction.

A further feature of advantage is the utilization of an adjustment screw 85 for the socket 53 of the upper bead guide to adjust the depth of the socket means and thus provide for a desired relationship of the centering means 40 for the upper and lower bead guides in relation to the tire beads of a tire.

While a preferred embodiment of the invention has been shown and described, it will be understood that various modifications and rearrangements may be made therein without departing from the spirit and scope of the invention.

The invention I claim is:

1. A tire molding machine for molding tire tread material to the outer periphery of an annular tire carcass having opposed annular tire beads lying radially inwardly of the periphery of the tire carcass and radially outwardly of the rotational axis of the carcass comprising opposed open ended cup-shaped tire molds mounted for relative movement of their open ends toward and away from each other to closed and opened positions, respectively, said molds having inner faces defining a tire receiving chamber in the closed position of said tire molds, tire tread matrices at the outer peripheries of said inner faces for displacement of tire tread material thereinto, first and second tire bead guides for engaging said tire beads associated with said tire molds for relative movement with respect thereto and for movement toward and away from each other, and motion transmitting means associated with said tire bead guides for effecting conjoint and uniform movement of said tire bead guides toward and away from each other when engaged with said tire beads said motion transmitting means including centering means for guiding movement of said tire bead guides toward and away from each other on the rotational axis of said carcass, said centering means comprising a centering rod mounted for movement relative to and within one of said tire bead guides, centering socket means having a socket for the other of said tire bead guides for receiving one end of said centering rod, and said motion transmitting means comprising drive means connected with said one tire bead guide for maintaining said one end of said centering rod in engagement with said centering socket in movement of said tire bead guides toward and away from each other.

2. The tire molding machine of claim 1 characterized by said centering socket means comprising adjusting means for adjusting the depth of said socket in said other tire bead guide.

3. The tire molding machine of claim 1 comprising biasing means associated with said drive means for biasing said one tire bead guide away from the other of said tire bead guides.

4. A tire molding machine for molding tire tread material to the outer periphery of an annular tire carcass having opposed annular tire beads lying radially inwardly of the periphery of the tire carcass and radially outwardly of the rotational axis of the carcass comprising opposed open ended cup-shaped tire molds mounted for relative movement of their open ends toward and away from each other to closed and opened positions, respectively, said molds having inner faces defining a tire receiving chamber in the closed position of said tire molds, tire tread matrices at the outer peripheries of said inner faces for displacement of tire tread material thereinto, first and second tire bead guides for engaging said tire beads associated with said tire molds for relative movement with respect thereto and for movement toward and away from each other, and motion transmitting means associated with said tire bead guides for effecting conjoint and uniform movement of said tire bead guides toward and away from each other when engaged with said tire beads, said motion transmitting means including centering means for guiding movement of said tire bead guides toward and away from each other on the rotational axis of said carcass, said tire molds having their open ends extending horizontally, mold positioning means comprising a first piston and a first cylinder for moving said tire molds toward and away from each other, first tire bead guide positioning means for one of said tire bead guides comprising a second piston and a second cylinder with said second cylinder being connected directly to said first piston, and second tire bead guide positioning means for the other of said tire bead guides comprising a third piston and a third cylinder in which said third piston is connected to said other of said tire bead guides.

5. A tire molding machine for molding tire tread material to the outer periphery of an annular tire carcass having opposed annular tire beads lying radially inwardly of the periphery of the tire carcass and radially outwardly of the rotational axis of the carcass comprising opposed open ended cup-shaped tire molds mounted for relative movement of their open ends toward and away from each other to closed and opened positions, respectively, said molds having inner faces defining a tire receiving chamber in the closed position of said tire molds, tire tread matrices at the outer peripheries of said inner faces for displacement of tire tread material thereinto, first and second tire bead guides for engaging said tire beads associated with said tire molds for relative movement with respect thereto and for movement toward and away from each other, and motion transmitting means associated with said tire bead guides for effecting conjoint and uniform movement of said tire bead guides toward and away from each other when engaged with said tire beads, said motion transmitting means including centering means for guiding movement of said tire bead guides toward and away from each other on the rotational axis of said carcass, said tire molds having their open ends extending horizontally, mold positioning means comprising a first piston and a first cylinder for moving said tire molds toward and away from each other, first tire bead guide positioning means for one of said tire bead guides comprising a second piston and a second cylinder with said second cylinder being connected directly to said first piston, and second tire bead guide positioning means for the other of said tire bead guides comprising a third piston and a third cylinder in which said third piston is connected to said other of said tire bead guides, said other tire bead guide being connected to said third piston by a hollow rod, said centering means comprising a centering rod mounted for movement within and relative to said hollow rod, centering socket means having a socket for the other of said tire bead guides for receiving one end of said centering rod, and said motion transmitting means comprising drive means connected with said hollow rod for maintaining one end of said centering rod in engagement with said centering socket in movement of said tire bead guides when engaged with said tire beads toward and away from each other.

6. The tire molding machine of claim 5 characterized by said drive means comprising a toothed rack, in which said centering rod is provided with a toothed portion, and a pinion mounted for rotation on a fixed axis and being engaged with the toothed portions of said rack and said centering rod.

7. The tire molding machine of claim 6 characterized by the provision of spring means anchored at one end and connected at its other end to said hollow rod for biasing said one tire bead guide away from said other tire bead guide.

8. A tire molding machine for molding tire tread material to the outer periphery of an annular tire carcass having opposed annular tire beads lying radially inwardly of the periphery of the tire carcass and radially outwardly of the rotational axis of the carcass comprising opposed open ended cup-shaped tire molds mounted for relative movement of their open ends toward and away from each other to closed and opened positions, respectively, said molds having inner faces defining a tire receiving chamber in the closed position of said tire molds, tire tread matrices at the outer peripheries of said inner faces for displacement of tire tread material thereinto, first and second tire bead guides for engaging said tire beads associated with said tire molds for relative movement with respect thereto and for movement toward and away from each other, motion transmitting means associated with said tire bead guides for effecting conjoint and uniform movement of said tire bead guides toward and away from each other when engaged with said tire beads, one of said cup-shaped tire molds fixedly mounted with its open end extending horizontally, the other of said cup-shaped tire molds disposed above said one cup-shaped tire mold with its open end extending horizontally, mold positioning means comprising a first piston and a first cylinder for moving said other tire mold toward and away from said one tire mold, first tire bead guide positioning means for one of said tire bead guides comprising a second piston and a second cylinder with said second cylinder being connected directly to said first piston, second tire bead guide positioning means for the other of said tire bead guides comprising a third piston and a third cylinder in which said third piston is connected to said other of said tire bead guides, said other tire bead guide being connected to said third piston by a hollow rod, said motion transmitting means including centering means for guiding movement of said tire bead guides toward and away from each other on the rotational axis of said carcass, said centering means comprising a centering rod mounted for movement within and relative to said hollow rod, centering socket means having a socket for the other of said tire bead guides for receiving one end of said centering rod, said motion transmitting drive means connected with said hollow rod for maintaining one end of said centering rod in engagement with said centering socket for movement of said tire bead guides toward and away from each other when engaged with said tire beads, said drive means comprising a toothed rack, said centering rod having a toothed portion, and a pinion mounted for rotation upon a fixed axis and being engaged with the toothed portions of said rack and said centering rod, and spring means anchored at one end and connected at its other end to said hollow rod for biasing said one tire bead guide away from said other tire bead guide.

9. A tire molding machine for molding tread material to the outer periphery of an annular tire carcass having opposed annular tire beads lying radially inwardly of the periphery of the tire carcass and radially outwardly of the rotational axis of the carcass comprising a lower cup-shaped tire mold fixedly mounted with its open end extending horizontally and opening upwardly, an upper cup-shaped tire mold disposed above said lower cup-shaped tire mold with its open end extending horizontally and opening downwardly and toward the open end of said lower cup-shaped tire mold, mold positioning means for said upper tire mold for moving the same toward and away from said lower tire mold to closed and opened positions, respectively, said lower and upper tire molds having inner faces defining a tire receiving chamber in the closed position of said tire molds, tire tread matrices at the outer peripheries of said inner faces for displacement of the tire tread material thereinto, tire bead guides for engaging said tire beads associated, respectively, with said lower and upper tire molds for relative movement with respect thereto and for movement toward and away from each other, tire bead guide positioning means associated with said lower mold for positioning the tire bead guide associated with said lower tire mold above the open end of said lower cup-shaped tire mold for supporting said tire carcass thereon in the opened position of said lower and upper cup-shaped tire molds, motion transmitting means associated with said tire bead guides for effecting for movement of the latter toward and away from each other, said motion transmitting means including centering means for guiding movement of said tire bead guides toward and away from each other on the rotational axis of said carcass, said centering means comprising a centering rod mounted for movement relative to and within said tire bead guide associated with said lower mold, centering socket means having a socket for said tire bead guide associated with said upper mold for receiving one end of said centering rod, and said motion transmitting means comprising drive means for maintaining said one end of said centering rod in engagement with said centering socket in movement of said tire bead guides toward and away from each other.

10. The tire molding machine of claim 9 comprising biasing means associated with said drive means for biasing said tire bead guide associated with said lower mold away from said tire bead guide associated with said upper mold.